United States Patent
Baba et al.

(10) Patent No.: US 10,704,533 B2
(45) Date of Patent: Jul. 7, 2020

(54) WIND TURBINE POWER GENERATING APPARATUS AND METHOD OF OPERATING THE SAME

(71) Applicant: MITSUBISHI HEAVY INDUSTRIES, LTD., Tokyo (JP)

(72) Inventors: Mitsuya Baba, Tokyo (JP); Yoshiyuki Hayashi, Tokyo (JP); Wakako Ariki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 251 days.

(21) Appl. No.: 15/396,163

(22) Filed: Dec. 30, 2016

(65) Prior Publication Data
US 2017/0218921 A1    Aug. 3, 2017

(30) Foreign Application Priority Data
Jan. 29, 2016   (JP) .................. 2016-015734

(51) Int. Cl.
*F03D 17/00* (2016.01)
*F03D 7/02* (2006.01)
(Continued)

(52) U.S. Cl.
CPC ......... *F03D 7/0224* (2013.01); *F03D 7/0276* (2013.01); *F03D 7/042* (2013.01);
(Continued)

(58) Field of Classification Search
CPC ........ F05B 2270/807; F05B 2270/1095; F05B 2270/331; F05B 2270/808;
(Continued)

(56) References Cited

U.S. PATENT DOCUMENTS 4,324,528 A * 4/1982 Svenning .............. F03D 7/0224
                                                  416/132 B
4,331,881 A * 5/1982 Soderholm ........... F03D 7/0272
                                                  290/44

(Continued)

FOREIGN PATENT DOCUMENTS

CA    2893657 A1 * 12/2015 ........... F03D 7/0224
EP    1327773 A2    7/2003
(Continued)

OTHER PUBLICATIONS

Extended European Search Report in EP Application No. 16204308.7, dated Jun. 27, 2017. 8pp.
(Continued)

*Primary Examiner* — George C Jin
*Assistant Examiner* — Teuta B Holbrook
(74) *Attorney, Agent, or Firm* — Kanesaka Berner and Partners LLP

(57) ABSTRACT

A method of operating a wind turbine power generating apparatus including a wind turbine rotor having a wind turbine blade includes: a step of obtaining a load applied to the wind turbine blade; and a step of selecting an operation mode of the wind turbine power generating apparatus on the basis of the load, from among a plurality of operation modes including a normal operation mode and at least one load-suppressing operation mode in which the load applied to the wind turbine blade is smaller than in the normal operation mode.

12 Claims, 10 Drawing Sheets

(51) Int. Cl.
*F03D 9/25* (2016.01)
*F03D 7/04* (2006.01)
(52) U.S. Cl.
CPC ............... *F03D 9/25* (2016.05); *F03D 17/00* (2016.05); *F05B 2240/221* (2013.01); *F05B 2270/1095* (2013.01); *F05B 2270/327* (2013.01); *F05B 2270/331* (2013.01); *F05B 2270/807* (2013.01); *F05B 2270/808* (2013.01); *Y02E 10/721* (2013.01); *Y02E 10/723* (2013.01); *Y02E 10/725* (2013.01)
(58) Field of Classification Search
CPC .......... F05B 2270/327; F05B 2270/332; F05B 2270/821; F05B 2240/221; F03D 17/00; F03D 7/0224; F03D 7/0276; F03D 7/042; F03D 9/25; Y02E 10/721; Y02E 10/723
USPC .................. 416/1, 36–37, 31, 41, 43, 47–48
See application file for complete search history.

(56) References Cited

U.S. PATENT DOCUMENTS

| | | | |
|---|---|---|---|
| 6,361,275 B1* | 3/2002 | Wobben | F03D 7/0224 416/31 |
| 6,940,186 B2* | 9/2005 | Weitkamp | F03D 7/042 290/44 |
| 6,948,910 B2* | 9/2005 | Polacsek | F03D 1/0608 416/1 |
| 7,452,185 B2* | 11/2008 | Ide | F03D 7/0224 416/35 |
| 7,898,100 B2 | 3/2011 | Andersen et al. | |
| 7,948,104 B2 | 5/2011 | Andersen | |
| 8,098,939 B2 | 1/2012 | Oliver | |
| 8,128,362 B2 | 3/2012 | Andersen et al. | |
| 8,202,048 B2 | 6/2012 | Stiesdal et al. | |
| 8,334,608 B2* | 12/2012 | Pechlivanoglou | F03D 7/0248 290/44 |
| 8,523,520 B2 | 9/2013 | Nagasaki | |
| 8,585,363 B2* | 11/2013 | Jeppesen | F03D 7/0224 416/1 |
| 8,694,268 B2* | 4/2014 | Karikomi | F03D 7/0292 702/34 |
| 8,793,027 B2 | 7/2014 | Nyborg et al. | |
| 8,810,055 B2 | 8/2014 | Mascarell et al. | |
| 8,890,349 B1 | 11/2014 | Lynch et al. | |
| 9,127,645 B2* | 9/2015 | Bertolotti | F03D 7/0204 |
| 2008/0206051 A1 | 8/2008 | Wakasa et al. | |
| 2009/0047129 A1 | 2/2009 | Yoshida | |
| 2009/0068013 A1* | 3/2009 | Birkemose | F03D 7/0204 416/31 |
| 2010/0014971 A1* | 1/2010 | Risager | F03D 7/0224 416/1 |
| 2010/0087960 A1* | 4/2010 | Hayashi | F03D 7/0204 700/287 |
| 2010/0148507 A1* | 6/2010 | Lim | F03D 7/0296 290/44 |
| 2011/0084485 A1* | 4/2011 | Miranda | F03D 7/0224 290/44 |
| 2011/0135469 A1* | 6/2011 | Scholte-Wassink | F03D 80/00 416/1 |
| 2011/0140431 A1* | 6/2011 | Landa | F03D 7/0224 290/44 |
| 2011/0178771 A1* | 7/2011 | Miranda | F03D 7/0224 702/182 |
| 2012/0051952 A1 | 3/2012 | Knoop | |
| 2012/0070280 A1* | 3/2012 | Wadehn | F03D 7/0212 416/1 |
| 2012/0112458 A1* | 5/2012 | Numajiri | F03D 7/0204 290/44 |
| 2012/0139240 A1 | 6/2012 | Otamendi Claramunt et al. | |
| 2012/0292905 A1* | 11/2012 | Slot | F03D 1/065 290/44 |
| 2013/0033040 A1 | 2/2013 | Bowyer et al. | |
| 2013/0125632 A1* | 5/2013 | Bjerge | F03D 7/00 73/112.01 |
| 2013/0161955 A1* | 6/2013 | Dalsgaard | F03D 7/0224 290/44 |
| 2013/0209254 A1* | 8/2013 | Hess | F03D 7/0224 416/1 |
| 2013/0214535 A1* | 8/2013 | Brath | F03D 7/0264 290/44 |
| 2015/0240783 A1* | 8/2015 | Kii | F03D 7/0204 290/44 |
| 2015/0240788 A1* | 8/2015 | Kayama | G01N 19/08 416/61 |
| 2015/0263521 A1* | 9/2015 | Garcia | F03D 7/048 307/52 |
| 2015/0285222 A1* | 10/2015 | Chauvin | F03D 17/00 290/44 |
| 2015/0308416 A1* | 10/2015 | Ambekar | F03D 17/00 700/287 |
| 2016/0053745 A1* | 2/2016 | Blom | F03D 7/045 416/1 |
| 2016/0069323 A1* | 3/2016 | Arlaban Gabeiras | F03D 7/0276 416/1 |
| 2016/0140264 A1* | 5/2016 | Miura | G06F 30/20 703/2 |
| 2018/0142676 A1* | 5/2018 | Pedersen | F03D 7/0224 |

FOREIGN PATENT DOCUMENTS

| | | | | |
|---|---|---|---|---|
| EP | 2022981 A1 | 2/2009 | | |
| EP | 2025929 A2 | 2/2009 | | |
| EP | 2108829 A1 | 10/2009 | | |
| EP | 2375063 A1 | 10/2011 | | |
| EP | 2679811 A1 | 1/2014 | | |
| EP | 2696068 A2 | 2/2014 | | |
| EP | 2853730 A1 | 4/2015 | | |
| GB | 2448940 A * | 11/2008 | ............. F03D 1/065 | |
| GB | 2480701 A | 11/2011 | | |
| JP | 3962645 B2 | 8/2007 | | |
| JP | 2008-274953 A | 11/2008 | | |
| JP | 5022102 B2 | 9/2012 | | |
| WO | 2005/083266 A1 | 9/2005 | | |
| WO | 2008/131778 A2 | 11/2008 | | |
| WO | WO-2009141651 A2 * | 11/2009 | ............... H02J 3/14 | |
| WO | 2011/150927 A1 | 12/2011 | | |
| WO | 2011/157272 A1 | 12/2011 | | |
| WO | 2012/025121 A2 | 3/2012 | | |
| WO | 2012/124023 A1 | 9/2012 | | |
| WO | 2012/152280 A1 | 11/2012 | | |
| WO | 2013/010332 A1 | 1/2013 | | |
| WO | 2014/173417 A1 | 10/2014 | | |
| WO | 2015/014366 A1 | 2/2015 | | |
| WO | 2015/074664 A1 | 5/2015 | | |
| WO | 2015/135549 A1 | 9/2015 | | |

OTHER PUBLICATIONS

Invention Note "Wind turbines_Design requirements-(6) External conditions", 61400-1, IEC:2005, pp. 21-26.
Office Action in JP Application No. 2016-015734, dated Dec. 1, 2017. 6pp.

* cited by examiner

WIND TURBINE POWER GENERATING APPARATUS AND METHOD OF OPERATING THE SAME

RELATED APPLICATIONS

The present application is based on, and claims priority from, Japanese Application Number 2016-015734, filed Jan. 29, 2016, the disclosure of which is hereby incorporated by reference herein in its entirety.

TECHNICAL FIELD

The present disclosure relates to a wind turbine power generating apparatus and a method of operating the same.

BACKGROUND ART

Techniques have been proposed to change an operation mode of a wind turbine power generating apparatus to protect the wind turbine power generating apparatus under harsh weather conditions such as a high wind velocity.

For instance, Patent Document 1 discloses a method for continuously operating a wind turbine power generating apparatus in a high-velocity range on or above a critical wind velocity. Patent Document 1 discloses controlling the pitch angle of wind turbine blades to reduce an output non-continuously in accordance with the wind velocity in a high wind-velocity range on or above a critical wind velocity.

CITATION LIST

Patent Literature

Patent Document 1: U.S. Pat. No. 7,948,104B

SUMMARY

Meanwhile, loads applied to wind turbine blades are affected not only by the wind velocity of wind received by a wind turbine rotor but also by the rotation speed of the wind turbine rotor, the pitch angle of the wind turbine blades, and the like.

Nevertheless, in the operation method disclosed in Patent Document 1, the only determination criteria for changing the operation output is wind velocity, which is just one of the several determining factors of loads to be applied to wind turbine blades.

It is desirable to appropriately evaluate loads on wind turbine blades taking account of factors other than the wind velocity to appropriately reduce loads applied to the wind turbine blades, thereby reducing loads to be applied to components of a wind turbine (e.g. a drive train connected to a wind turbine rotor including wind turbine blades, and a nacelle and a tower supporting the wind turbine rotor).

In view of the above issues, an object of at least one embodiment of the present invention is to provide a method of operating a wind turbine power generating apparatus whereby it is possible to appropriately reduce loads to be applied to components of a wind turbine.

(1) A method of operating a wind turbine power generating apparatus including a wind turbine rotor having a wind turbine blade, according to at least one embodiment of the present invention, comprises: a step of obtaining a load applied to the wind turbine blade; and a step of selecting an operation mode of the wind turbine power generating apparatus on the basis of the load, from among a plurality of operation modes including a normal operation mode and at least one load-suppressing operation mode in which the load applied to the wind turbine blade is smaller than in the normal operation mode.

In the above method (1), an operation mode is selected on the basis of a load applied to a wind turbine blade, which may be a direct cause of contact of the wind turbine blade to the tower, damage to the wind turbine blade, and the like. In other words, whether to select a load-suppressing operation mode in which a load applied to the wind turbine blade is more suppressed than in the normal operation mode is decided on the basis of a load on the wind turbine blade, and thereby it is possible to select an operation mode even more appropriately in accordance with the load than in a case where an operation mode is selected solely on the basis of only a part (e.g. wind velocity) of determination factors of the load applied to the wind turbine blade. Thus, it is possible to increase the opportunity of power generation by the wind turbine power generating apparatus while reducing loads applied to components of a wind turbine including the wind turbine blade so as to appropriately suppress contact of the wind turbine blade with the tower and occurrence of damage to the wind turbine blade or the like.

(2) In some embodiments, in the above method (1), in the step of selecting the operation mode, one of the at least one load-suppressing operation mode is selected if at least one of the load or an amplitude of the load is at least a threshold.

According to the above method (2), the wind turbine power generating apparatus is operated in a load-suppressing operation mode when the load on the wind turbine blade or the amplitude of the load is relatively large. The load may be a direct cause of contact of the wind turbine blade with the tower or damage to the wind turbine blade or the like. Accordingly, it is possible to select a load-suppressing operation mode appropriately when selecting the normal operation mode may lead to application of an excessive load and/or an excessive load amplitude to the wind turbine blade. Thus, it is possible to increase the opportunity of power generation by the wind turbine power generating apparatus while reducing loads applied to components of a wind turbine including the wind turbine blade so as to appropriately suppress contact of the wind turbine blade with the tower and occurrence of damage to the wind turbine blade or the like.

(3) In some embodiments, in the above method (2), in the step of selecting the operation mode, one of the at least one load-suppressing mode is selected if the load is at least a threshold. The threshold of the load is variable in accordance with at least one of a rotation speed of the wind turbine rotor, a moment Md of the wind turbine rotor about a line in which a rotational plane and a horizontal plane of the wind turbine rotor intersect with each other, or a moment Mq of the wind turbine rotor about a yaw-rotational axis of the wind turbine power generating apparatus.

A load applied to a wind turbine blade increases with an increase in the rotation speed of the rotor, even if the wind conditions are the same. Accordingly, a load applied to a wind turbine blade is correlated to the rotor rotation speed. Thus, the load may exceed an allowable range soon after the operation mode is changed to the normal operation mode, even if the load applied to the wind turbine blade is within the allowable range while the rotor rotation speed is limited in a load-suppressing operation mode. In this regard, if the threshold of the load is variable in accordance with the rotation speed of the wind turbine rotor as in the above method (3), it is possible to select an operation mode appropriately in view of an influence that the rotor rotation speed has on the load.

Furthermore, even if the load applied to the wind turbine blade is within an allowable range, the wind turbine blade may come into contact with the tower or the yaw brake may slide if the moment Md or Mq applied to the wind turbine rotor is excessive. Specifically, the moment Md applied to the wind turbine rotor about a line in which the rotational plane and the horizontal plane of the wind turbine rotor intersect is an index of the risk of contact of the wind turbine blade with the tower. The moment Mq applied to the wind turbine rotor about a yaw rotational axis of the wind turbine power generating apparatus is an index of the risk of occurrence of yaw-angle slide which may cause damage to a yaw motor. In this regard, if the threshold of the load is variable in accordance with the moment Md or Mq as in the above method (3), it is possible to prevent occurrence of contact of the wind turbine blade with the tower and slide of the yaw brake.

(4) In some embodiments, in any one of the above methods (1) to (3), the method further comprises a step of obtaining, on the basis of the load, at least one of a moment Md of the wind turbine rotor about a line in which a rotational plane and a horizontal plane of the wind turbine rotor intersect with each other, or a moment Mq of the wind turbine rotor about a yaw-rotation axis of the wind turbine power generating apparatus. In the step of selecting the operation mode, the operation mode is selected on the basis of the at least one of the moment Md or the moment Mq in addition to the load.

As described above, the moment Md is an index of the risk of the wind turbine blade being in contact with the tower, while the moment Mq is an index of the risk of occurrence of yaw-angle slide which may cause damage to a yaw motor. According to the above method (4), in addition to the load on the wind turbine blade, an operation mode of the wind turbine power generating apparatus is selected on the basis of the moment Md or Mq of the wind turbine rotor calculated from the load on the wind turbine blade, and thereby it is possible to reduce the outage time of the wind turbine power generating apparatus while appropriately suppressing contact of the wind turbine blade with the tower or occurrence of damage to the wind turbine blade or a yaw motor, for instance.

(5) In some embodiments, in any one of the above methods (1) to (4), the wind turbine power generating apparatus further comprises a nacelle for rotatably supporting the wind turbine rotor, and the method further comprises a step of obtaining an acceleration of the nacelle. In the step of selecting the operation mode, the operation mode is selected on the basis of the acceleration of the nacelle in addition to the load.

An acceleration of the nacelle is an index of vibration of the nacelle and components housed in the nacelle, or of the rotor supported by the nacelle. According to the above method (5), an operation mode of the wind turbine power generating apparatus is more appropriately selected on the basis of the acceleration of the nacelle in addition to the load on the wind turbine blade, and thereby it is possible to reduce the outage time of the wind turbine power generating apparatus while appropriately suppressing contact of the wind turbine blade with the tower or occurrence of damage to components or the like housed in the nacelle.

(6) In some embodiments, in any one of the above methods (1) to (5), in the at least one load-suppressing operation mode, the load is suppressed more than in the normal operation mode by reducing a rotation speed of the wind turbine rotor or by changing a pitch angle of the wind turbine blade to a feather side as compared to in an operation in the normal operation mode.

According to the above method (6), in the load-suppressing operation mode, the load applied to the wind turbine blade can be suppressed more than in the operation in the normal operation mode by reducing the rotation speed of the wind turbine rotor or by changing the pitch angle of the wind turbine blade to the feather side as compared to in the operation in the normal operation mode. Thus, it is possible to increase the opportunity of power generation by the wind turbine power generating apparatus while reducing loads applied to components of a wind turbine including the wind turbine blade so as to appropriately suppress contact of the wind turbine blade with the tower and occurrence of damage to the wind turbine blade or the like.

(7) In some embodiments, in any one of the above methods (1) to (6), the at least one load-suppressing operation mode includes a first load-suppressing operation mode, and a second load-suppressing operation mode in which the load is suppressed more than in the first load-suppressing operation mode by reducing a rotation speed of the wind turbine rotor or by changing a pitch angle of the wind turbine blade to a feather side as compared to in the first load-suppressing operation mode.

According to the above method (7), the load-suppressing operation mode includes the first load-suppressing operation mode and the second load-suppressing operation mode in which the load is suppressed more than in the first load-suppressing operation mode. Providing a plurality of load-suppressing operation modes makes it possible to suppress the load on the wind turbine blade in stages in accordance with the load on the wind turbine blade and the rotation speed of the wind turbine rotor or the pitch angle of the wind turbine blade, and to increase the opportunity of power generation of the wind turbine power generating apparatus.

(8) A wind turbine power generating apparatus according to at least one embodiment of the present invention comprises: a wind turbine rotor having a wind turbine blade; a load sensor for obtaining a load applied to the wind turbine blade; and an operation-mode selecting part configured to select an operation mode of the wind turbine power generating apparatus, on the basis of the load obtained by the load sensor, from among a plurality of operation modes including a normal operation mode and at least one load-suppressing operation mode in which the load applied to the wind turbine blade is smaller than in the normal operation mode.

With the above configuration (8), an operation mode is selected on the basis of a load applied to a wind turbine blade, which may be a direct cause of contact of the wind turbine blade to the tower, damage to the wind turbine blade, and the like. In other words, whether to select a load-suppressing operation mode in which a load applied to the wind turbine blade is more suppressed than in the normal operation mode is decided on the basis of the load on the wind turbine blade, and thereby it is possible to select an operation mode even more appropriately in accordance with the load than in a case where an operation mode is selected solely on the basis of only a part (e.g. wind velocity) of determination factors of the load applied to the wind turbine blade. Thus, it is possible to increase the opportunity of power generation by the wind turbine power generating apparatus while reducing loads applied to components of a wind turbine including the wind turbine blade so as to appropriately suppress contact of the wind turbine blade with the tower and occurrence of damage to the wind turbine blade or the like.

(9) In some embodiments, in the above configuration (8), the operation-mode selecting part is configured to select one of the at least one load-suppressing operation mode if at least one of the load or an amplitude of the load is at least a threshold.

With the above configuration (9), the wind turbine power generating apparatus is operated in a load-suppressing operation mode when the load on the wind turbine blade or the amplitude of the load is relatively large. The load may be a direct cause of contact of the wind turbine blade with the tower or damage to the wind turbine blade or the like. Accordingly, it is possible to select a load-suppressing operation mode appropriately when selecting the normal operation mode may lead to application of an excessive load and/or an excessive load amplitude to the wind turbine blade. Thus, it is possible to reduce loads applied to components of a wind turbine including the wind turbine blade, and to increase the opportunity of power generation by the wind turbine power generating apparatus while appropriately suppressing contact of the wind turbine blade with the tower and occurrence of damage to the wind turbine blade or the like.

(10) In some embodiments, in the above configuration (9), the operation-mode selecting part is configured to select one of the at least one load-suppressing mode if the load is at least a threshold. The threshold of the load is variable in accordance with at least one of a rotation speed of the wind turbine rotor, a moment Md of the wind turbine rotor about a line in which a rotational plane and a horizontal plane of the wind turbine rotor intersect with each other, or a moment Mq of the wind turbine rotor about a yaw-rotational axis of the wind turbine power generating apparatus.

A load applied to a wind turbine blade increases with an increase in the rotation speed of the rotor, even if the wind conditions are the same. Accordingly, a load applied to a wind turbine blade is correlated to the rotor rotation speed. Thus the load may exceed an allowable range soon after the operation mode is changed to the normal operation mode, even if the load applied to the wind turbine blade is within the allowable range while the rotor rotation speed is limited in a load-suppressing operation mode. In this regard, if the threshold of the load is variable in accordance with the rotation speed of the wind turbine rotor as in the above configuration (10), it is possible to select an operation mode appropriately in view of an influence that the rotor rotation speed has on the load.

Furthermore, even if the load applied to the wind turbine blade is within an allowable range, the wind turbine blade may come into contact with the tower or the yaw brake may slide if the moment Md or Mq applied to the wind turbine rotor is excessive. Specifically, the moment Md applied to the wind turbine rotor about a line in which the rotational plane and the horizontal plane of the wind turbine rotor intersect is an index of the risk of contact of the wind turbine blade with the tower. The moment Mq applied to the wind turbine rotor about a yaw rotational axis of the wind turbine power generating apparatus is an index of the risk of occurrence of yaw-angle slide which may cause damage to a yaw motor. In this regard, if the threshold of a load is variable in accordance with the moment Md or Mq as in the above configuration (10), it is possible to prevent occurrence of contact of the wind turbine blade with the tower or slide of the yaw brake.

(11) In some embodiments, in any one of the above configurations (8) to (10), the wind turbine power generating apparatus further comprises a moment calculating part configured to obtain, on the basis of the load, at least one of a moment Md of the wind turbine rotor about a line in which a rotational plane and a horizontal plane of the wind turbine rotor intersect with each other, or a moment Mq of the wind turbine rotor about a yaw-rotation axis of the wind turbine power generating apparatus. The operation-mode selecting part is configured to select the operation mode on the basis of the at least one of the moment Md or the moment Mq obtained by the moment calculating part, in addition to the load.

As described above, the moment Md is an index of the risk of the wind turbine blade being in contact with the tower, while the moment Mq is an index of the risk of occurrence of yaw-angle slide which may cause damage to a yaw motor. With the above configuration (11), in addition to the load on the wind turbine blade, an operation mode of the wind turbine power generating apparatus is selected on the basis of the moment Md or Mq of the wind turbine rotor calculated from the load M the wind turbine blade, and thereby it is possible to reduce the outage time of the wind turbine power generating apparatus while appropriately suppressing contact of the wind turbine blade with the tower or occurrence of damage to the wind turbine blade or a yaw motor, for instance.

(12) In some embodiments, in any one of the above configurations (8) to (11), the wind turbine power generating apparatus further comprises a nacelle for rotatably supporting the wind turbine rotor; and an acceleration sensor for obtaining an acceleration of the nacelle. The operation-mode selecting part is configured to select the operation mode on the basis of the acceleration of the nacelle obtained by the acceleration sensor, in addition to the load.

An acceleration of the nacelle is an index of vibration of the nacelle and components housed in the nacelle, or of the rotor supported by the nacelle. With the above configuration (12), an operation mode of the wind turbine power generating apparatus is more appropriately selected on the basis of the acceleration of the nacelle in addition to the load on the wind turbine blade, and thereby it is possible to reduce the outage time of the wind turbine power generating apparatus while appropriately suppressing contact of the wind turbine blade with the tower or occurrence of damage to components housed in the nacelle, for instance.

(13) In some embodiments, in any one of the above configurations (8) to (12), the wind turbine power generating apparatus further comprises an operation control part for controlling operation of the wind turbine power generating apparatus on the basis of the operation mode. The operation control part is configured to, in the at least one load-suppressing operation mode, suppress the load more than in the normal operation mode by reducing a rotation speed of the wind turbine rotor or by changing a pitch angle of the wind turbine blade to a feather side as compared to in an operation in the normal operation mode.

With the above configuration (13), in the load-suppressing operation mode, the load applied to the wind turbine blade can be suppressed as compared to in the operation in the normal operation mode by reducing the rotation speed of the wind turbine rotor or by changing the pitch angle of the wind turbine blade to the feather side than in the operation in the normal operation mode. Thus, it is possible to increase the opportunity of power generation by the wind turbine power generating apparatus while reducing loads applied to components of a wind turbine including the wind turbine blade so as to appropriately suppress contact of the wind turbine blade with the tower and occurrence of damage to the wind turbine blade or the like.

(14) In some embodiments, in any one of the above configurations (8) to (13), the at least one load-suppressing operation mode includes a first load-suppressing operation mode, and a second load-suppressing operation mode in which the load is suppressed more than in the first load-suppressing operation mode by reducing a rotation speed of the wind turbine rotor or by changing a pitch angle of the wind turbine blade to a feather side as compared to in the first load-suppressing operation mode.

With the above configuration (14), the load-suppressing operation mode includes the first load-suppressing operation mode and the second load-suppressing operation mode in which the load is suppressed more than in the first load-suppressing operation mode. Providing a plurality of load-suppressing operation modes makes it possible to suppress the load on the wind turbine blade in stages in accordance with the load on the wind turbine blade and the rotation speed of the wind turbine rotor or the pitch angle of the wind turbine blade, and to increase the opportunity of power generation of the wind turbine power generating apparatus.

According to at least one embodiment of the present invention, it is possible to provide a method of operating a wind turbine power generating apparatus whereby it is possible to reduce loads to be applied to components of a wind turbine appropriately.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

An over-all configuration of a wind turbine power generating apparatus to which an operation method according to some embodiments is to be applied will be described.

Figure 1:
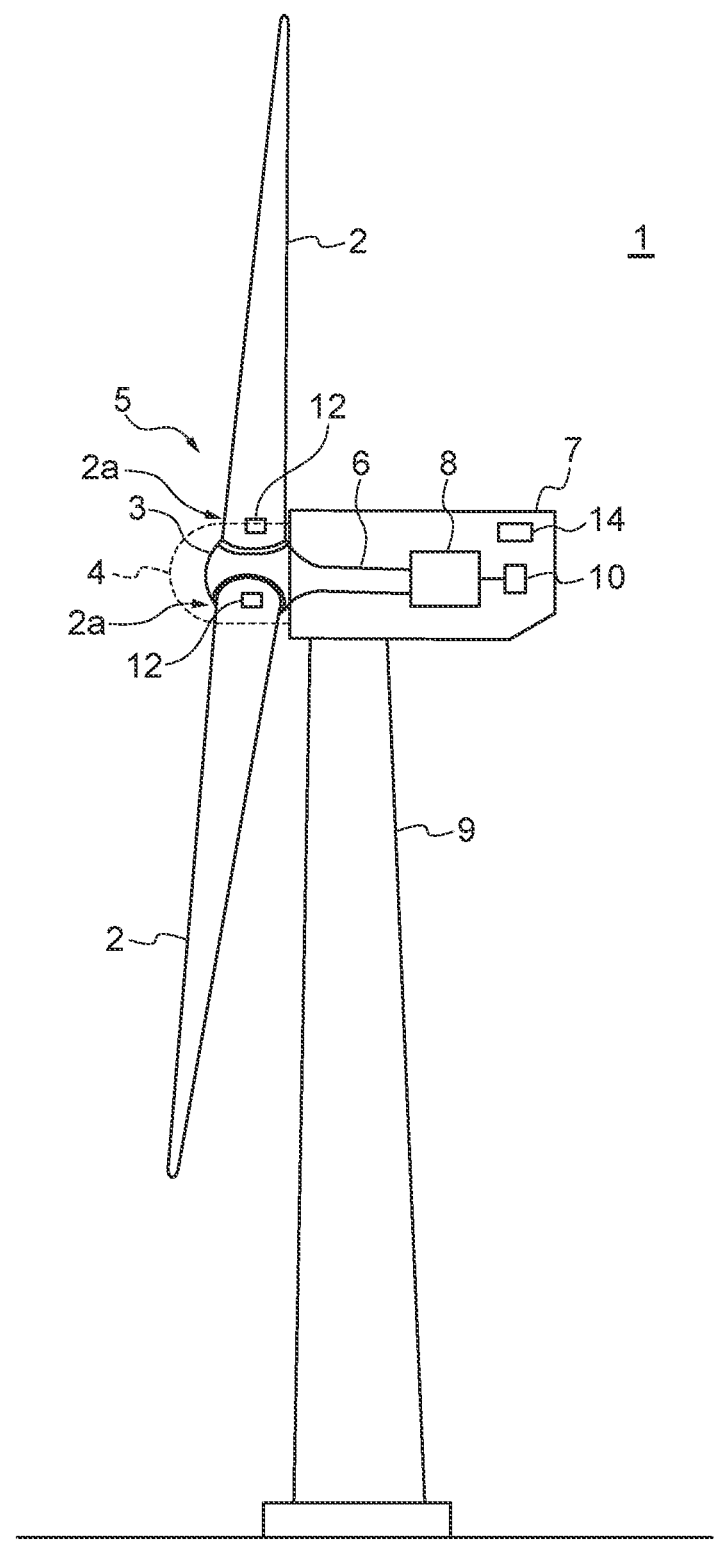
FIG. 1 is a schematic configuration diagram of a wind turbine power generating apparatus according to an embodiment.

FIG. 1 is a schematic configuration diagram of a wind turbine power generating apparatus according to an embodiment. As depicted in the drawing, a wind turbine power generating apparatus 1 includes a wind turbine rotor 5 including at least one wind turbine blade 2 and a hub 3, a main shaft 6 coupled to the hub 3, and a generator 10 driven by rotational energy of the wind turbine rotor 5. The main shaft 6 and the generator 10 are connected to each other via the drive train 8, and rotational energy of the wind turbine rotor 5 is transmitted to the generator 10 via the main shaft 6 and the drive train 8.

Furthermore, the wind turbine power generating apparatus 1 includes a nacelle 7 for housing equipment including the main shaft 6, the drive train 8, and the generator 10, and a tower 9 to support the nacelle 7. The wind turbine rotor 5 is supported rotatably by the nacelle 7. The hub 3 may be covered with a spinner (hub cover) 4.

The wind turbine power generating apparatus 1 may be an offshore wind turbine power generating apparatus installed on ocean, or an onshore wind turbine power generating apparatus installed on land.

The wind turbine power generating apparatus 1 further includes a load sensor 12 for obtaining loads (blade loads) applied to the wind turbine blade 2.

The load sensor 12 includes, for instance, a strain sensor mounted to a blade root portion 2a of the wind turbine blade 2, and may be configured to calculate loads applied to the wind turbine blade 2 on the basis of strain data obtained by the strain sensor. It should be noted that the blade root portion 2a of the wind turbine blade 2 is a structural portion constituting an end portion of the wind turbine blade 2 on the side of the hub 3, which receives a bending moment transmitted from the wind turbine blade 2 to the hub 3.

In a case where the wind turbine rotor 5 includes a plurality of wind turbine blades 2, the load sensor 12 may be disposed on each of the plurality of wind turbine blades 2 and configured to obtain loads that act on the respective wind turbine blades 2.

In an embodiment, the wind turbine power generating apparatus 1 may include an acceleration sensor for obtaining acceleration of the nacelle 7.

Figure 2:
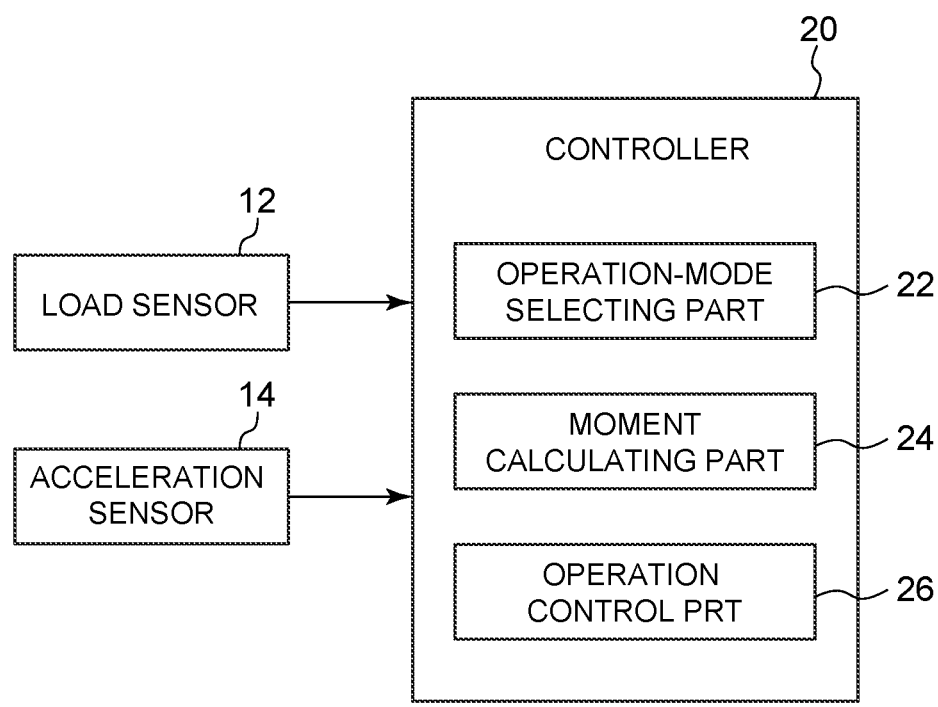
FIG. 2 is a configuration diagram of a controller of a wind turbine power generating apparatus according to an embodiment.

FIG. 2 is a configuration diagram of a controller of a wind turbine power generating apparatus according to an embodiment.

The wind turbine power generating apparatus 1 further includes a controller 20 for controlling operation of the wind turbine power generating apparatus 1. As depicted in FIG. 2, the controller 20 according to an embodiment includes an operation-mode selecting part 22, a moment calculating part 24, and an operation control part 26.

The operation-mode selecting part 22 is configured to select an operation mode of the wind turbine power generating apparatus 1 from among a plurality of operation modes, on the basis of blade loads obtained by the load sensor 12, acceleration of the nacelle 7 obtained by the acceleration sensor 14, and the like.

The moment calculating part 24 is configured to calculate a moment of the wind turbine rotor 5 on the basis of blade loads obtained by the load sensor 12.

The operation control part 26 is configured to control operation of the wind turbine power generating apparatus 1 on the basis of the operation mode selected by the operation-mode selecting part 22.

Next, a method of operating a wind turbine power generating apparatus according to some embodiments will be described, the method being applied to the above described wind turbine power generating apparatus 1 as an example.

Figure 3:
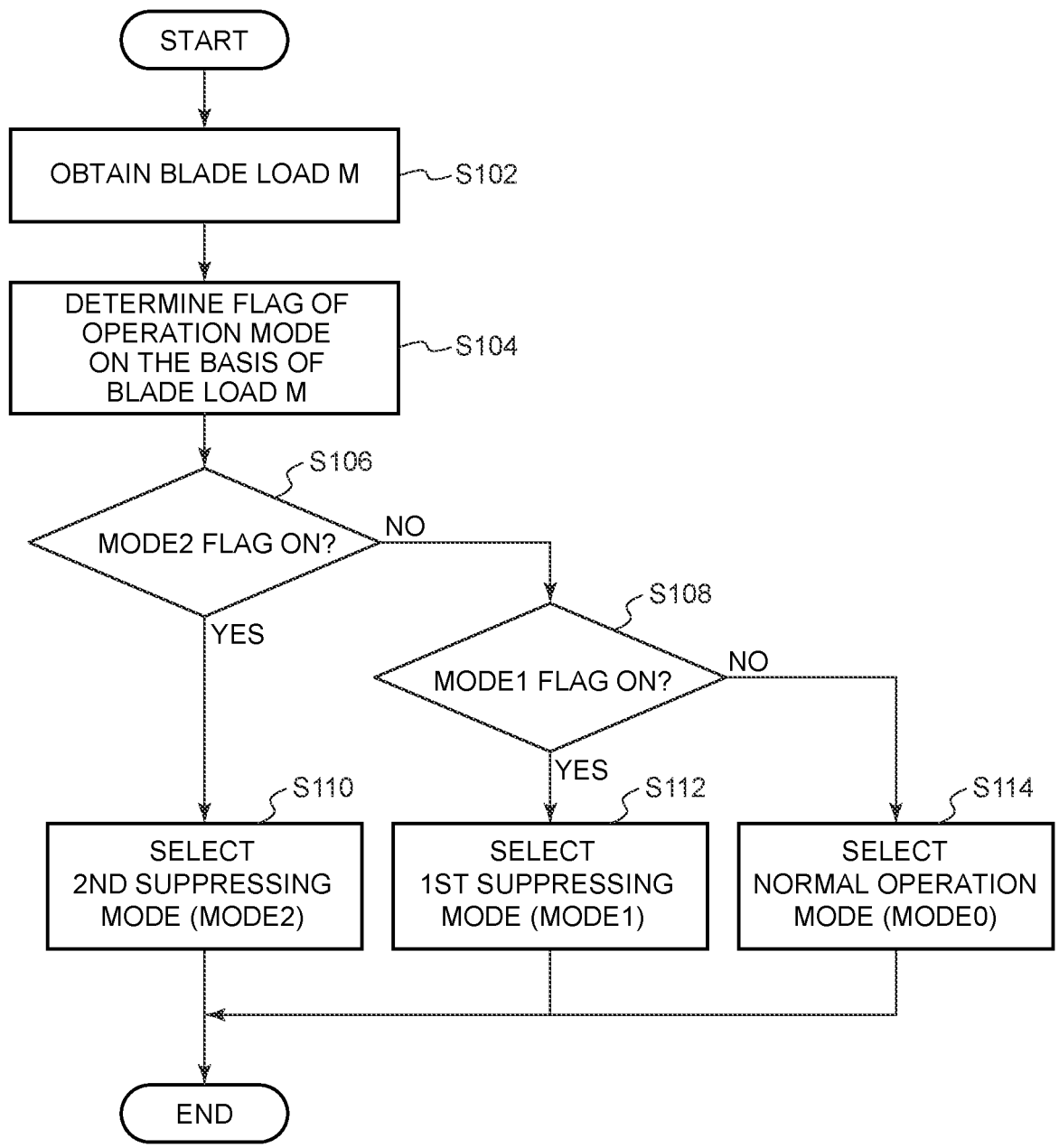
FIG. 3 is a flowchart of a method of operating a wind turbine power generating apparatus according to an embodiment.

FIG. 3 is a flowchart of a method of operating a wind turbine power generating apparatus according to an embodiment. As depicted in FIG. 3, a method of operating a wind turbine power generating apparatus according to an embodiment includes a step of obtaining a load M applied to the wind turbine blades 2 (S102), and steps of selecting an operation mode of the wind turbine power generating apparatus 1 on the basis of the load M obtained in step S102 (S104 to S114). The wind turbine power generating apparatus 1 is operated in the operation mode selected in steps S104 to S114.

In step S102, the load sensor 12 provided for the wind turbine blade 2 may be used to obtain the load M applied to the wind turbine blade 2.

In the steps of selecting an operation mode of the wind turbine power generating apparatus 1 (S104 to S114), the operation-mode selecting part 22 selects an operation mode of the wind turbine power generating apparatus 1 from among a plurality of operation modes including a normal operation mode (Mode0), and one or more load-suppressing operation modes (Mode1, Mode 2, . . . ) in which smaller loads are applied to the wind turbine blade 2 than in the normal operation mode (i.e., loads are suppressed). More specifically, in the operation method depicted in the flowchart of FIG. 3, in the steps of selecting an operation mode, an operation mode of the wind turbine power generating apparatus 1 is selected from among three operation modes including the normal operation mode (Mode0), the first load-suppressing operation mode (Mode1) in which smaller loads are applied to the wind turbine blade 2 than in the normal operation mode (Mode0), and the second load-suppressing operation mode (Mode2) in which even smaller loads are applied to the wind turbine blade 2 than in the first load-suppressing operation mode (Mode1).

In another embodiment, in the step of selecting an operation mode of the wind turbine power generating apparatus 1, an operation mode of the wind turbine power generating apparatus 1 may be selected from two operation modes including the normal operation mode (Mode0) and the above mentioned first load-suppressing operation mode (Mode1). Alternatively, in another embodiment, in the step of selecting an operation mode, an operation mode of the wind turbine power generating apparatus 1 may be selected from four or more operation modes including the normal operation mode (Mode0), the above mentioned first load-suppressing operation mode (Mode1), the above mentioned second load-suppressing operation mode (Mode2), and another one or more load-suppressing operation mode (Mode 3, . . . ). Furthermore, operation modes of the wind turbine power generating apparatus 1 may include a stop mode for stopping operation of the wind turbine power generating apparatus 1 in a wind condition more harsh than a condition in which a load-suppressing operation mode is selected.

Hereinafter, the first load-suppressing operation mode and the second load-suppressing operation mode are also referred to as the first suppressing mode and the second suppressing mode, respectively.

The steps of selecting an operation mode of the wind turbine power generating apparatus 1 (S104 to S114) will be described in more detail.

In the steps of selecting an operation mode, the operation-mode selecting part 22 determines whether conditions for setting a flag for each operation mode are satisfied, on the basis of the load M obtained in step S102, and turns on a flag of an operation mode whose conditions are satisfied (S104).

Furthermore, the operation-mode selecting part 22 selects an operation mode corresponding to the flag of an operation mode turned ON in step S104 (S106 to S114). For instance, if the flag of the second suppressing mode (Mode 2) is turned ON in step S104 (YES in S106), the second suppressing mode is selected (S110). If the flag of the first suppressing mode (Mode1) is turned ON in step S104 (NO in S106 and YES in S108), the first suppressing mode is selected (S112). Alternatively, if the flag of the normal operation mode (Mode0) is turned ON in step S104 (NO in S106 and NO in S108), the normal operation mode is selected (S114).

Accordingly, in steps S104 to S114, from among the normal operation mode (Mode0), the first suppressing mode (Mode1), and the second suppressing mode (Mode2), a flag of an operation mode whose conditions for setting the flag are satisfied is turned ON, and an operation mode corresponding to the flag is selected.

In an embodiment, in the steps of selecting an operation mode (S104 to S114), the operation-mode selecting part 22 selects a load-suppressing operation mode (the first suppressing mode or the second suppressing mode), if the load M obtained in step S102 is at least a threshold. Specifically, in step S104, a flag of a load-suppressing operation mode (the first suppressing mode or the second suppressing mode) is turned ON if the load M obtained in step S102 is at least a threshold.

The load M may be a load in a flap direction of the wind turbine blade 2 (flap load). A flap direction of the wind turbine blade 2 is a direction orthogonal to a direction connecting a leading edge and a trailing edge (an edge direction or a cord direction) in a cross section orthogonal to the longitudinal direction of a wind turbine blade.

Figure 4:
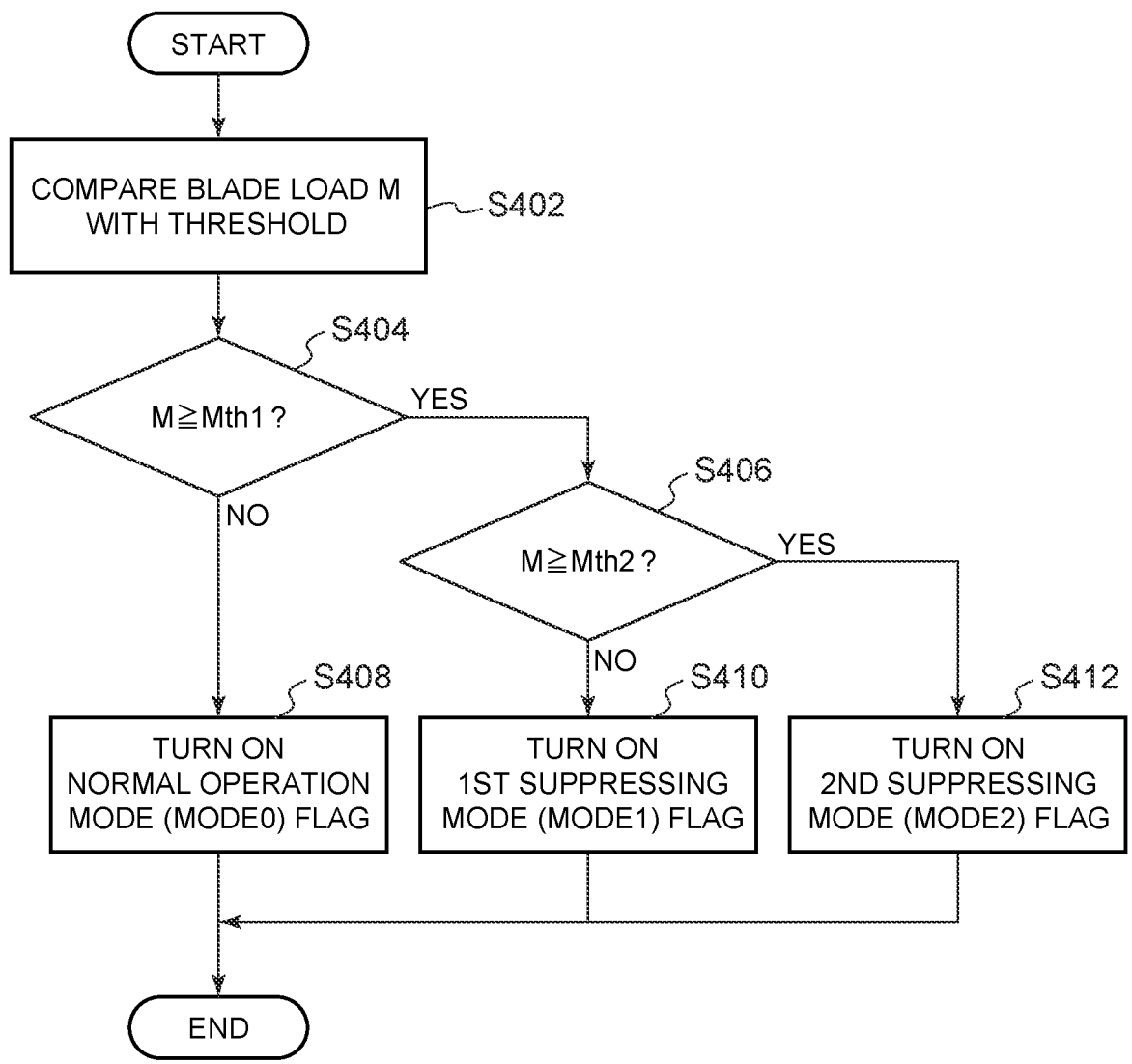
FIG. 4 is a flowchart of steps for determining an operation mode according to an embodiment.

Step S104 according to the above embodiment will now be described with reference to FIG. 4. FIG. 4 is a flowchart of the step of determining an operation mode (S104) according to an embodiment.

In an embodiment, in the step of determining an operation mode (S104), the operation-mode selecting part 22 compares the load M (the load M obtained in step S102) to a threshold (S402), and turns ON a flag of a load-suppressing operation mode if the load M is at least the threshold, or a flag of the normal operation mode if the load M is less than the threshold (S404 to S412).

More specifically, the operation-mode selecting part 22 compares the load M with a threshold Mth1 (S404), and if the load M is less than a threshold Mth1 (NO in S404), turns ON the flag of the normal operation mode (S408). If the load M is not less than the threshold Mth1 in step S404 (YES in S404), the operation-mode selecting part 22 further compares the load M with a threshold Mth2 (where Mth2>Mth1) (S406), and if the load M is less than the threshold Mth2 (NO in S406), turns ON the flag of the first suppressing mode (S410), and if the load M is not less than the threshold Mth2 (YES in S406), turns ON the flag of the second suppressing mode (S412).

As described above, in the step of determining an operation mode (S104), the load M applied to the wind turbine blade 2 is compared to thresholds (Mth1, Mth2), and thereby a flag of one of the operation modes is turned ON. Then, the operation-mode selecting part 22 selects an operation mode corresponding to the flag turned ON in step S104 (S110 to S114), and the operation control part 26 controls operation of the wind turbine power generating apparatus 1 on the basis of the operation mode.

In the operation method including the above described steps S102 to S114, whether to select a load-suppressing operation mode in which the load on the wind turbine blade 2 is more suppressed than in the normal operation mode is determined on the basis of the load on the wind turbine blade 2. Thus, it is possible to select an operation mode in accordance with the load M more appropriately than in a case where an operation mode is selected solely on the basis of only a part (e.g. wind velocity) of determination factors of the load applied to the wind turbine blade 2.

Furthermore, according to the operation method including the above described steps S102 to S114, the wind turbine power generating apparatus 1 is operated in a load-suppressing operation mode when the load M on the wind turbine blade 2 is relatively large. The load M may be a direct cause of contact of the wind turbine blade 2 with the tower 9 or damage to the wind turbine blade 2 or the like. Accordingly, it is possible to select a load-suppressing operation mode appropriately when selecting the normal operation mode may lead to application of an excessive load to the wind turbine blade 2. Thus, it is possible to increase the opportunity of power generation by the wind turbine power generating apparatus 1 while reducing loads applied to components of a wind turbine (the wind turbine power generating apparatus 1) including the wind turbine blade 2 and appropriately suppressing contact of the wind turbine blade 2 with the tower 9 and occurrence of damage to the wind turbine blade 2 or the like.

In an embodiment, in the steps of selecting an operation mode (S104 to S114), if an amplitude of the load M applied to the wind turbine blade 2 is at least a threshold, a flag of a load-suppressing operation mode may be turned ON, and an operation mode of the wind turbine power generating apparatus 1 may be selected on the basis of the flag.

An amplitude of the load M applied to the wind turbine blade 2 is an index of a fatigue load applied to the wind turbine blade 2, and may be a direct factor of damage to the wind turbine blade 2. Thus, by operating the wind turbine power generating apparatus 1 in a load-suppressing operation mode if the amplitude of the load M of the wind turbine blade 2 is at least a threshold as described above, it is possible to select a load-suppressing operation mode appropriately when selecting the normal operation mode may lead to application of an excessive load amplitude to the wind turbine blade 2. Thus, it is possible to increase the opportunity of power generation by the wind turbine power generating apparatus 1 while reducing loads applied to components of a wind turbine (the wind turbine power generating apparatus 1) including the wind turbine blade 2 and appropriately suppressing occurrence of damage to the wind turbine blade 2.

Furthermore, in an embodiment, in the steps of selecting an operation mode (S104 to S114), if both of the load M applied to the wind turbine blade 2 and the amplitude of the load M are at least a threshold, a flag of a load-suppressing operation mode may be turned ON, and an operation mode of the wind turbine power generating apparatus 1 may be selected on the basis of the flag.

In some embodiments, in the load-suppressing operation mode, the rotation speed of the wind turbine rotor 5 (rotor rotation speed) is reduced as compared to in operation in the normal operation mode, and thereby the load applied to the wind turbine blade 2 is suppressed as compared to in operation in the normal operation mode.

For instance, if the target rotation speed (rpm) is $\Omega_0$ in the normal operation mode, the target rotation speed may be $\Omega_1$ (where $\Omega_1 < \Omega_0$) in the load-suppressing operation mode.

In an embodiment with a plurality of load-suppressing operation modes including the first suppressing mode and the second suppressing mode, that loads applied to the wind turbine 2 are suppressed more in the second suppressing mode than in the first suppressing mode by setting the rotation speed of the wind turbine rotor 5 to be lower than in the first suppressing mode.

For instance, with two load-suppressing operation modes (two stages), the target rotation speed may be $\Omega_0$ in the normal operation mode, $\Omega_1$ (where $\Omega_1 < \Omega_0$) in the first suppressing mode, and $\Omega_2$ (where $\Omega_2 < \Omega_1$) in the second suppressing mode.

In some embodiments, in the load-suppressing operation mode, the load applied to the wind turbine blade 2 may be suppressed as compared to in operation in the normal operation mode by setting the pitch angle of the wind turbine blade 2 to be closer to the feather side than in operation in the normal operation mode. The operation method according to this embodiment can be applied to, for instance, a wind turbine power generating apparatus with a wind turbine rotor and a generator directly coupled to each other and not via a drivetrain, the wind turbine rotor having a fixed rotation speed.

In an embodiment with a plurality of load-suppressing operation modes including the first suppressing mode and the second suppressing mode, the pitch angle of the wind turbine blade 2 may be set to be closer to the feather side in the second suppressing mode than in the first suppressing mode, so as to suppress loads applied to the wind turbine 2 as compared to in the first suppressing mode.

In the steps of selecting an operation mode (the above described S104 to S114), in an embodiment of selecting the load-suppressing operation mode if the load M applied to the wind turbine blade 2 is at least a threshold (for instance, the embodiment described above with reference to the flow-charts of FIGS. 3 and 4), the threshold of the load M may be variable in accordance with the rotation speed of the wind turbine rotor 5 (rotor rotation speed).

An embodiment in which the threshold of the load M is variable in accordance with the rotation speed of the wind turbine rotor 5 will now be described with reference to FIG. 5.

Figure 5:
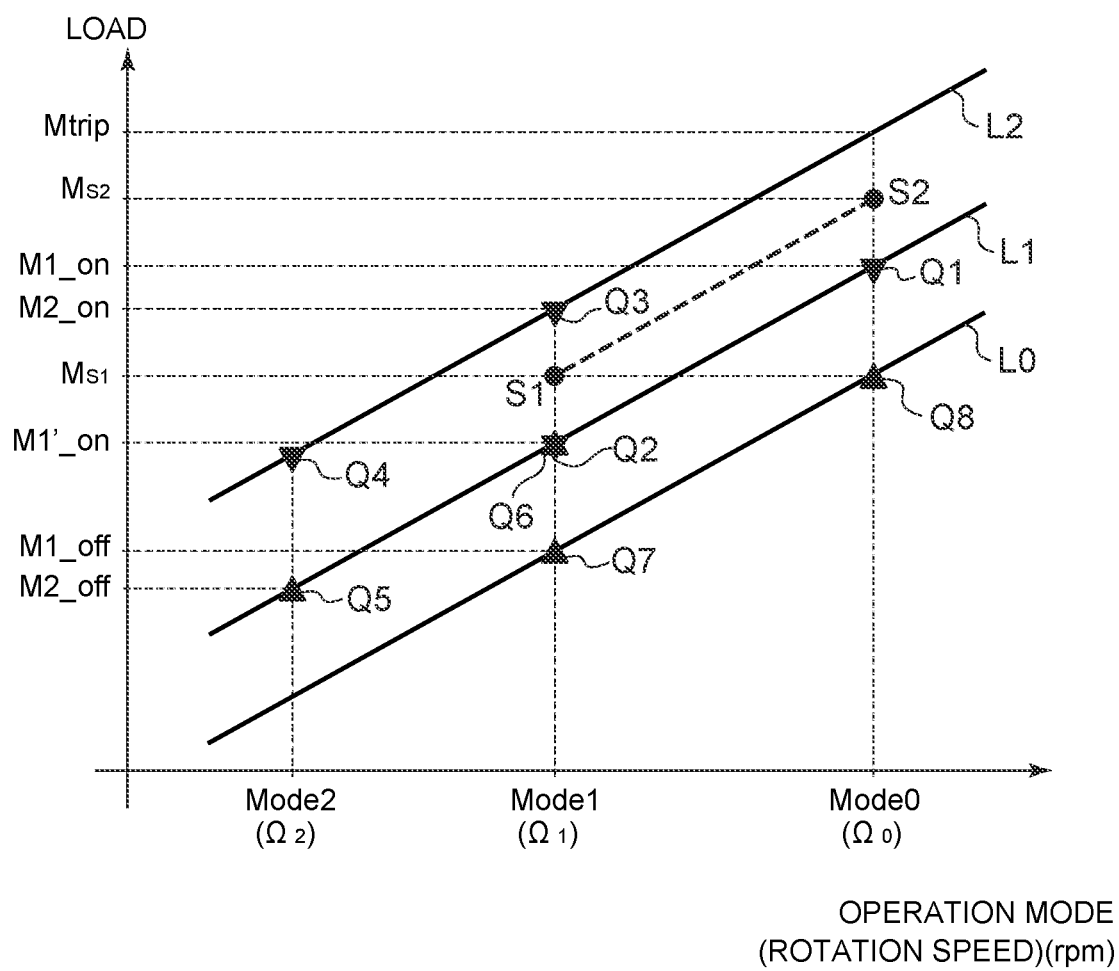
FIG. 5 is a graph showing a relationship between a rotor rotation speed and a threshold of a load corresponding to the rotor rotation speed.

FIG. 5 is a graph showing a relationship between a rotor rotation speed and a threshold of a load corresponding to the rotor rotation speed. In the graph of FIG. 5, x-axis is a rotor rotation speed and an operation mode of a wind turbine power generating apparatus corresponding to the rotor rotation speed, and y-axis is the magnitude of a load.

In the present embodiment, the target rotation speed is $\Omega_0$ in the normal operation mode (Mode0), $\Omega_1$ (where $\Omega_1 < \Omega_0$) in the first suppressing mode (Mode1), and $\Omega_2$ (where $\Omega_2 < \Omega_1$) in the second suppressing mode (Mode2).

In the graph of FIG. 5, lines L0 to L2 are each a line (equivalent load line) showing the level at which the load M applied to the wind turbine blade 2 is equivalent, L0 showing a "safe operation level" where the load M is relatively small, L1 showing a "dangerous operation level" where the load M is larger than that in L0, and L2 showing an "operation stop level" where the load M is even larger than that in L1.

In the graph of FIG. 5, M1_on is a threshold of the load M for determining whether to select the first suppressing mode during operation in the normal operation mode, and M2_on is a threshold of the load M for determining whether to select the second suppressing mode during operation in the first suppressing mode. In other words, M1_on and M2_on are thresholds of the load M for determining whether to select an operation mode in which blade loads are more suppressed than in the current operation mode.

Furthermore, M1_off is a threshold of the load M for determining whether to return to the normal operation mode during operation in the first suppressing mode, and M2_off is a threshold of the load M for determining whether to return to the first suppressing mode during operation in the second suppressing mode. In other words, M1_off and M2_off are thresholds of the load M for determining whether to select an operation mode closer to the normal operation mode than the current operation mode.

Mtrip is a threshold of the load M for determining whether to stop the wind turbine power generating apparatus 1 during operation in the normal operation mode. Furthermore, M1'_ion is a threshold of the load M for determining whether to issue an alert to inform that a load-suppressing operation is active.

If the thresholds of the load M are set as depicted in FIG. 5, the operation mode of the wind turbine power generating apparatus 1 shifts in accordance with the principle described below. In the following description, P1 to P7 correspond to points P1 to P7 in the graph of FIG. 5.

If the load M reaches M1_on or higher during operation in the normal operation mode (Mode0) (Q1), an alert is issued to inform that a load-suppressing operation is active, and the first suppressing mode (Mode1) is selected, and the operation mode shifts to operation in the first suppressing mode (Q2).

Alternatively, if the load M becomes M1'_ion or higher during operation in the first suppressing mode (Q2), an alert is issued to inform that a load-suppressing operation is active.

If the load M reaches M2_on (a load of "operation stop level" corresponding to Mtrip in the normal operation mode) or higher during operation in the first suppressing mode (Q3), the second suppressing mode (Mode 2) is selected, and the operation mode shifts to the second suppressing mode (Q4).

During operation in the second suppressing mode, if the load M falls below M2_off (a load of "dangerous operation level") (Q5), the operation mode shifts (returns) to operation in the first suppressing mode (Q6).

During operation in the first suppressing mode, if the load M falls below M1_off (a load of "safety operation level") (Q7), the operation mode shifts (returns) to operation in the normal operation mode (Q8).

If the load M becomes Mtrip or higher during operation in the normal operation mode (Mode0), the operation mode may shift to the stop mode to stop operation of the wind turbine power generating apparatus 1.

The load applied to the wind turbine blade 2 is correlated with the rotor rotation speed, and thus the load may exceed an allowable range soon after the operation mode is changed to the normal operation mode, even if the load applied to the wind turbine blade 2 is within the allowable range while the rotor rotation speed is limited in a load-suppressing operation mode. For instance, in the example depicted in FIG. 5, if the operation mode is changed to the normal operation mode when the load M applied to the wind turbine blade 2 is a load $M_{S1}$ of the safety operation level in the normal operation mode (Mode0) during operation in the first suppressing mode (Mode1), a load $M_{S2}$, which is larger than the load corresponding to the "dangerous operation level", could be applied to the wind turbine blade 2.

In this regard, if the threshold of the load M is variable in accordance with the rotation speed of the wind turbine rotor 5 as in the above embodiment, it is possible to select an operation mode appropriately in view of an influence that the rotor rotation speed has on the load.

Figure 6:
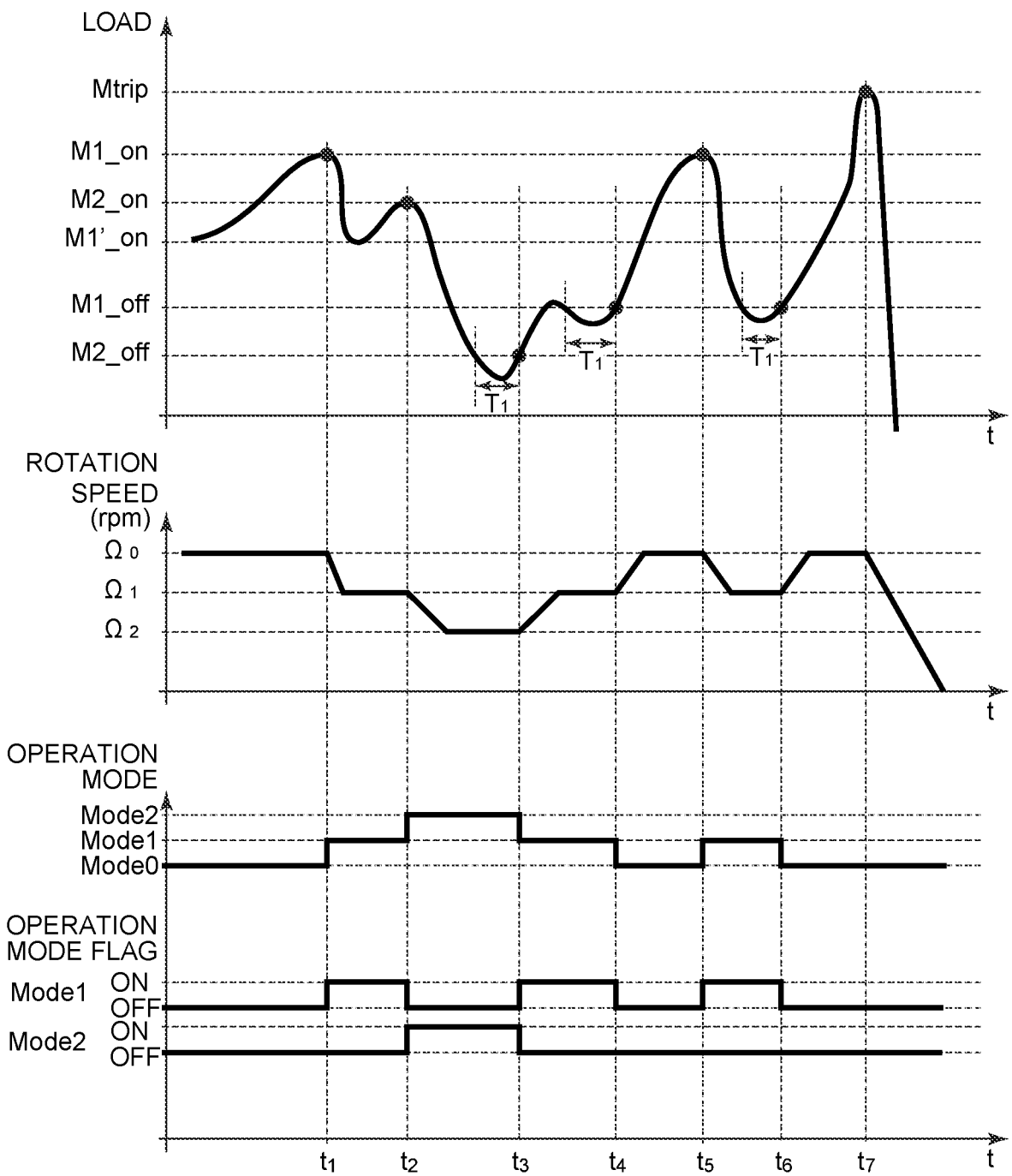
FIG. 6 is a diagram of an example of an operation control of a wind turbine power generating apparatus according to an embodiment.

FIG. 6 is a diagram of an example of an operation control of the wind turbine power generating apparatus 1 based on a relationship between the rotor rotation speed (operation mode) and the threshold of the load M depicted in the graph of FIG. 5. In FIG. 6, x-axis is time t, and y-axis is the load M applied to the wind turbine blade 2, the rotor rotation speed, and the operation mode, shown in this order from top to bottom.

At time t1 and time t5, the load M reaches the threshold M1_on or higher during operation in the normal operation mode (Mode0), and thus the first suppressing mode (Mode1) is selected and the operation mode shifts to the first suppressing mode.

At time t2, the load M reaches the threshold M2_on or higher during operation in the first suppressing mode, and thus the second suppressing mode (Mode2) is selected and the operation mode shifts to the second suppressing mode.

At time t3, the load M falls below the threshold M2_off during operation in the second suppressing mode, and thus the first suppressing mode is selected and the operation mode shifts (returns) to the first suppressing mode.

At time t4 and t6, the load M falls below the threshold M1_off during operation in the first suppressing mode, and thus the normal operation mode is selected and the operation mode shifts (returns) to the normal operation mode.

At time t7, the load M reaches the threshold Mtrip or higher during operation in the normal operation mode, and thus operation of the wind turbine power generating apparatus 1 shifts to the stop mode.

A change rate (rpm/sec) of the rotor rotation speed may be varied between transition of the operation mode between the normal operation mode and the first suppressing mode, and transition of the operation mode between the first suppressing mode and the second suppressing mode.

For instance, the rotor rotation speed may be changed relatively quickly when the operation mode shifts between the normal operation mode and the first suppressing mode, and relatively slowly when the operation mode shifts between the first suppressing mode and the second suppressing mode.

The reason for the above is to suppress loads applied to the wind turbine blade 2 quickly by changing the normal operation mode relatively quickly to the first suppressing mode, and to protect components of the wind turbine power generating apparatus 1 by changing the first suppressing mode relatively slowly to the second suppressing mode.

In the graph of FIG. 6, even when the load M falls below M1_off or M2_off, operation of the wind turbine power generating apparatus 1 is continued without changing the operation mode of a predetermined period Ti, and a flag of an operation mode is determined and an operation mode is selected after the elapse of the predetermined period Ti. The reason for the above is to prevent frequent transition of the operation mode when, for instance, where the wind velocity changes drastically during the predetermined period Ti.

Figure 7A:
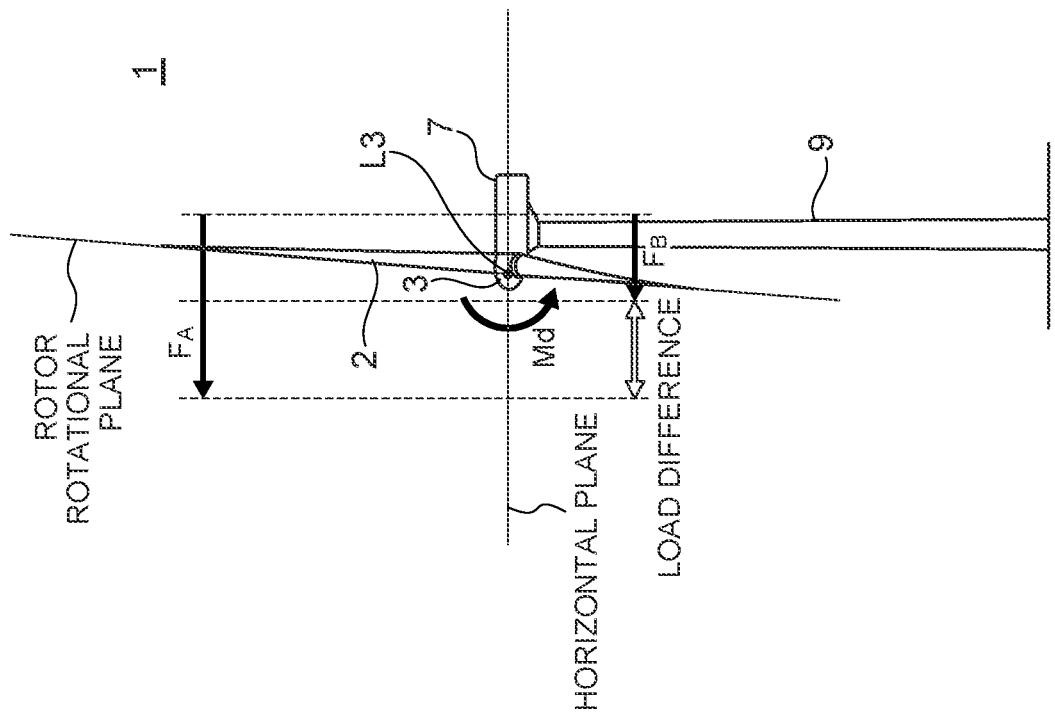
FIGS. 7A and 7B are each a diagram for describing a moment Md of a wind turbine rotor 5.
Figure 7B:
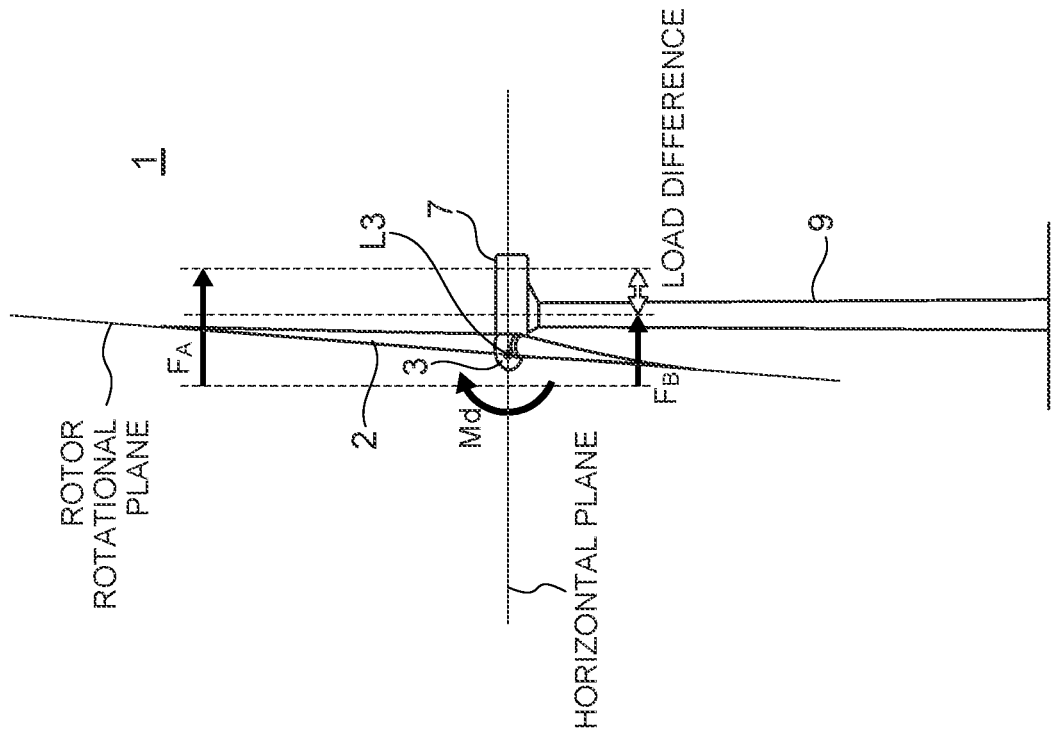
Figure 8:
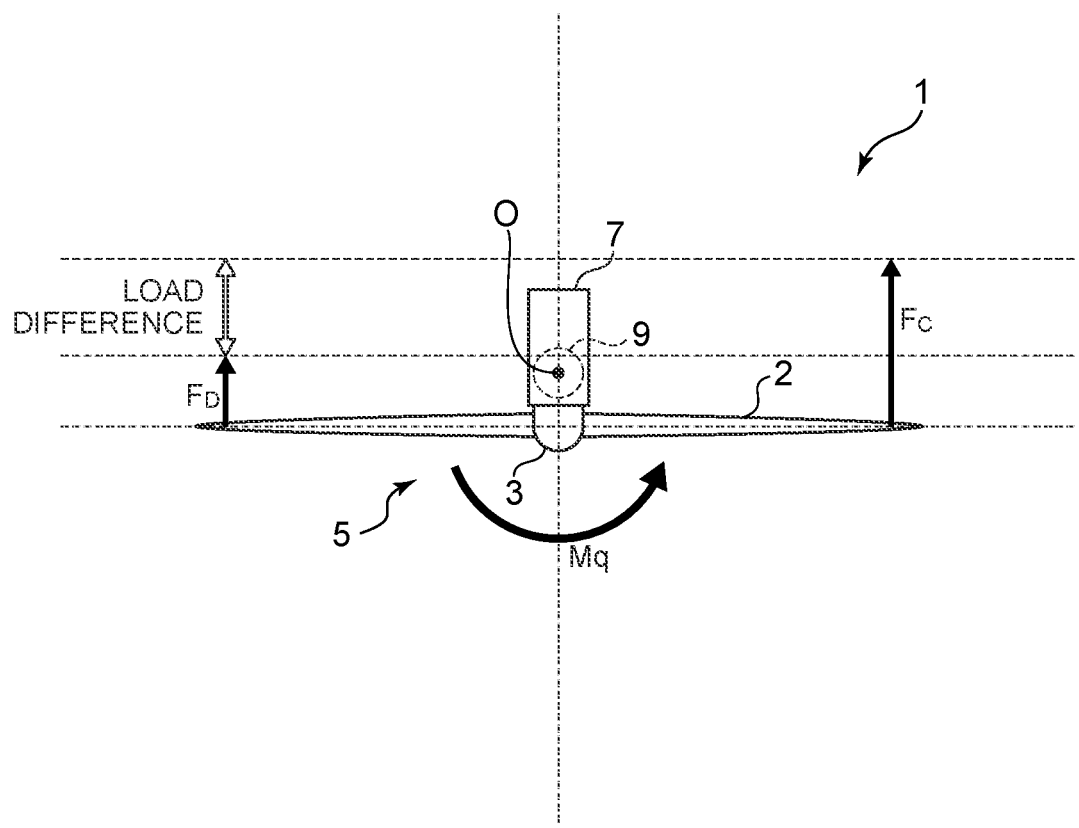
FIG. 8 is a diagram for describing a moment Mq of the wind turbine rotor 5.

FIGS. 7A and 7B are each a diagram for describing a moment Md of the wind turbine rotor 5. FIG. 8 is a diagram for describing a moment Mq of the wind turbine rotor 5.

In the steps of selecting an operation mode (the above described steps S104 to S114), in an embodiment of selecting a load-suppressing operation mode if the load M applied to the wind turbine blade 2 is at least a threshold (for instance, the embodiment described above with reference to the flowcharts of FIGS. 3 and 4), the threshold of the load M may be variable in accordance with a moment Md (see FIG. 7) of the wind turbine rotor 5 about line L3 in which the rotational plane and the horizontal plane of the wind turbine rotor 5 intersect, or in accordance with a moment Mq (see FIG. 8) of the wind turbine rotor 5 about the yaw rotational axis O of the wind turbine power generating apparatus 1.

The moment Md or the moment Mq of the wind turbine rotor 5 is calculated on the basis of the blade load M obtained in step S102 by the moment calculating part 24.

If the wind turbine rotor 5 includes a plurality of wind turbine blades 2, the moment Md or the moment Mq of the wind turbine rotor 5 is calculated by using the blade load of each of the plurality of wind turbine blades 2.

The load applied to the wind turbine blade 2 does not necessarily have a uniform distribution within the rotational plane of the wind turbine rotor 5.

For instance, as depicted in FIG. 7A, the load applied to the wind turbine blade 2 is larger when the wind turbine blade 2 is at the uppermost position of the wind turbine rotor 5 (load $F_A$) than when the wind turbine blade 2 is at the lowermost position of the wind turbine rotor 5 (load $F_B$). In this case, due to the difference between the above loads (load difference), a moment Md (face-up moment) about line L3 in which the rotational plane and the horizontal plane of the wind turbine rotor 5 intersect with each other is generated in the wind turbine rotor 5.

Furthermore, depending on the wind condition, as depicted in FIG. 7B, the load applied to the wind turbine blade 2 may be larger when the wind turbine blade 2 is at the uppermost position of the wind turbine rotor 5 (load $F_A$) than when the wind turbine blade 2 is at the lowermost position of the wind turbine rotor 5 (load $F_B$), and the load applied to the wind turbine 2 may be in a direction opposite to that in the case of FIG. 7A. In this case, due to the difference between the above loads (load difference), a moment Md (face-down moment) about line L3 in which the rotational plane and the horizontal plane of the wind turbine rotor 5 intersect with each other is generated in the wind turbine rotor 5.

When the cases of FIGS. 7A and 7B are compared, if the moment Md in the face-down direction as depicted in FIG. 7B is generated, there is a greater risk of contact between the wind turbine blade 2 and the tower 9. Specifically, the moment Md applied to the wind turbine rotor 5 is an index of the risk of contact of the wind turbine blade 2 with the tower 9.

Furthermore, even if the load M on the wind turbine blade 2 is within an allowable range, the wind turbine blade 2 may come into contact with the tower 9 if the moment Md applied to the wind turbine rotor 5 is excessive.

Thus, if the threshold of the blade load M is variable in accordance with moment Md when selecting an operation mode of the wind turbine power generating apparatus 1, it is possible to prevent contact of the wind turbine blade 2 with the tower 9 effectively.

Figure 9:
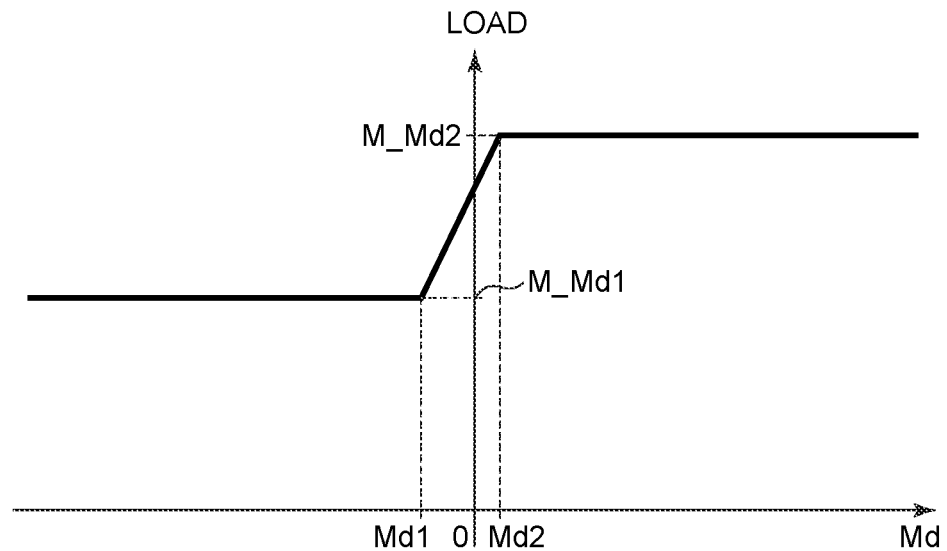
FIG. 9 is a graph of an example of a relationship between the moment Md and a threshold of a load.

FIG. 9 is a graph of an example of a relationship between the moment Md and a threshold of a load in a case in which the threshold of the load is variable in accordance with the moment Md.

In the graph of FIG. 9, x-axis is the moment Md and y-axis is the load. Furthermore, for the moment Md, the direction of the moment Md depicted in FIG. 7A (direction of face-up moment) is defined herein as positive.

As depicted in FIG. 9, a threshold $M_{-Md1}$ of load in a case where the moment Md is negative (i.e., a face-down moment Md as depicted in FIG. 7B is generated) and the absolute value of the moment Md is relatively large (in the graph of FIG. 9, the moment Md is Md1 or less) is smaller than a threshold $M_{-Md2}$ in a case where the moment Md is positive (i.e., a face-up moment Md as depicted in FIG. 7A is generated) and the absolute value of the moment Md is relatively large (in the graph of FIG. 9, the moment Md is at least Md2). Accordingly, a load suppressing mode can be selected more easily if the risk of the wind turbine blade 2 being in contact with the tower 9 is high.

Furthermore, for instance, as depicted in FIG. 8, the load applied to the wind turbine blade 2 is larger when the wind turbine blade 2 is on a lateral side of the wind turbine rotor 5 (load $F_C$) than when the wind turbine blade 2 is at the opposite lateral side of the wind turbine rotor 5 (load $F_D$). In this case, due to the difference between the above loads (load difference), a moment Mq of the wind turbine rotor 5 about the yaw rotational axis O of the wind turbine power generating apparatus 1 is generated in the wind turbine rotor 5.

The risk of occurrence of yaw-angle slide increases with an increase in the moment Mq of the wind turbine rotor 5 about the yaw rotational axis O of the wind turbine power generating apparatus 1. Thus, the moment Mq is an index of the risk of occurrence of yaw-angle slide which may cause damage to a yaw motor.

Furthermore, even if the load M on the wind turbine blade 2 is within an allowable range, slide of a yaw brake may occur if the moment Mq applied to the wind turbine rotor 5 is excessively large.

Thus, with the threshold of the blade load M being variable in accordance with moment Mq when selecting an operation mode of the wind turbine power generating apparatus 1, it is possible to prevent occurrence of slide of the yaw brake effectively.

Figure 10:
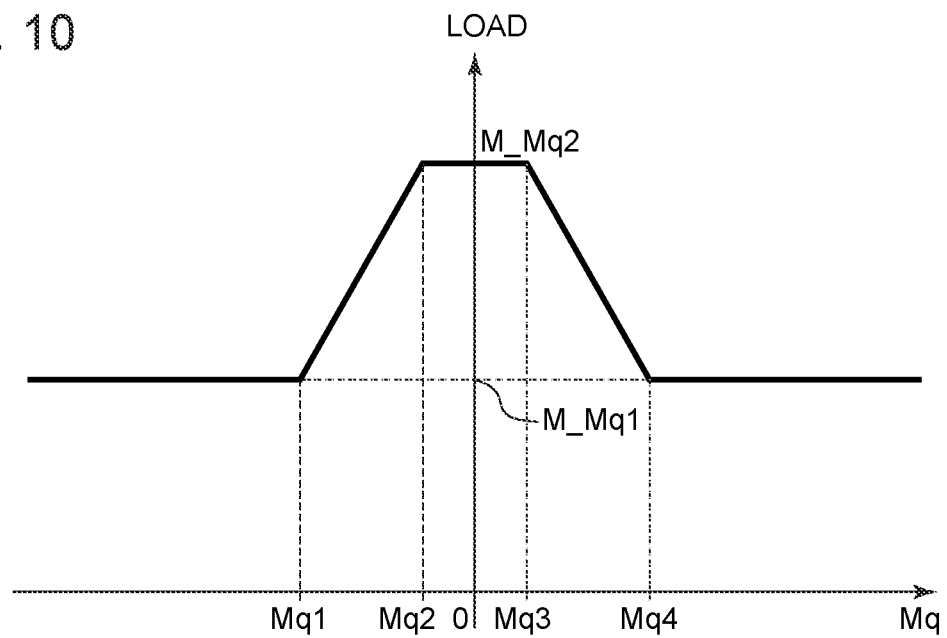
FIG. 10 is a graph of an example of a relationship between the moment Mq and a threshold of a load.

FIG. 10 is a graph of an example of a relationship between the moment Mq and a threshold of a load in a case in which the threshold of the load is variable in accordance with the moment Mq.

In the graph of FIG. 10, x-axis is the moment Mq and y-axis is the load. Furthermore, for the moment Mq, the direction of the moment Mq depicted in FIG. 8 (anti-clockwise direction in a planar view) is defined herein as positive.

As depicted in FIG. 10, a threshold $M_{-Mq1}$ of the load in a case where the absolute value of the moment Mq is relatively large (where the moment Mq is not more than Mq1 or not less than Mq4 in the graph of FIG. 10) is smaller than a threshold $M_{-Mq2}$ of the load in a case where the absolute value of the moment Mq is relatively small (where the moment Mq is larger than Mq2 and less than Mq3 in the graph of FIG. 10). Accordingly, a load suppressing mode can be selected more easily if the risk of occurrence of yaw-slide angle is high.

The operation method according to some embodiments further includes a step of obtaining at least one of the moment Md or the moment Mq of the above described wind turbine rotor 5 in accordance with the load M applied to the wind turbine blade 2, and/or a step of obtaining an acceleration of the nacelle 7 by using the acceleration sensor 14. Furthermore, in the step of selecting an operation mode, an operation mode is selected in accordance with the moment Md, the moment Mq, or an acceleration of the nacelle 7, in addition to the above described load M.

As described above, the moment Md is an index of the risk of the wind turbine blade 2 being in contact with the tower 9, while the moment Mq is an index of the risk of occurrence of yaw-angle slide which may cause damage to a yaw motor. Thus, in addition to the load M of the wind turbine blade 2, an operation mode of the wind turbine power generating apparatus 1 is selected on the basis of the moment Md or Mq of the wind turbine rotor 5 calculated from the load M of the wind turbine blade 2, and thereby it is possible to reduce the outage time of the wind turbine power generating apparatus 1 while appropriately suppressing contact of the wind turbine blade 2 with the tower 9 or occurrence of damage to the wind turbine blade 2 or a yaw motor, for instance.

Furthermore, an acceleration of the nacelle 7 is an index of vibration of the nacelle 7 and components housed in the nacelle 7, or of the wind turbine rotor 5 supported by the nacelle 7. Thus, in addition to the load on the wind turbine blade 2, an operation mode of the wind turbine power generating apparatus 1 is more appropriately selected on the basis of the acceleration of the nacelle 7, and thereby it is possible to reduce the outage time of the wind turbine power generating apparatus 1 while appropriately suppressing contact of the wind turbine blade 2 with the tower 9 or occurrence of damage to the wind turbine blade 2 or components housed in the nacelle 7, for instance.

Figure 11:
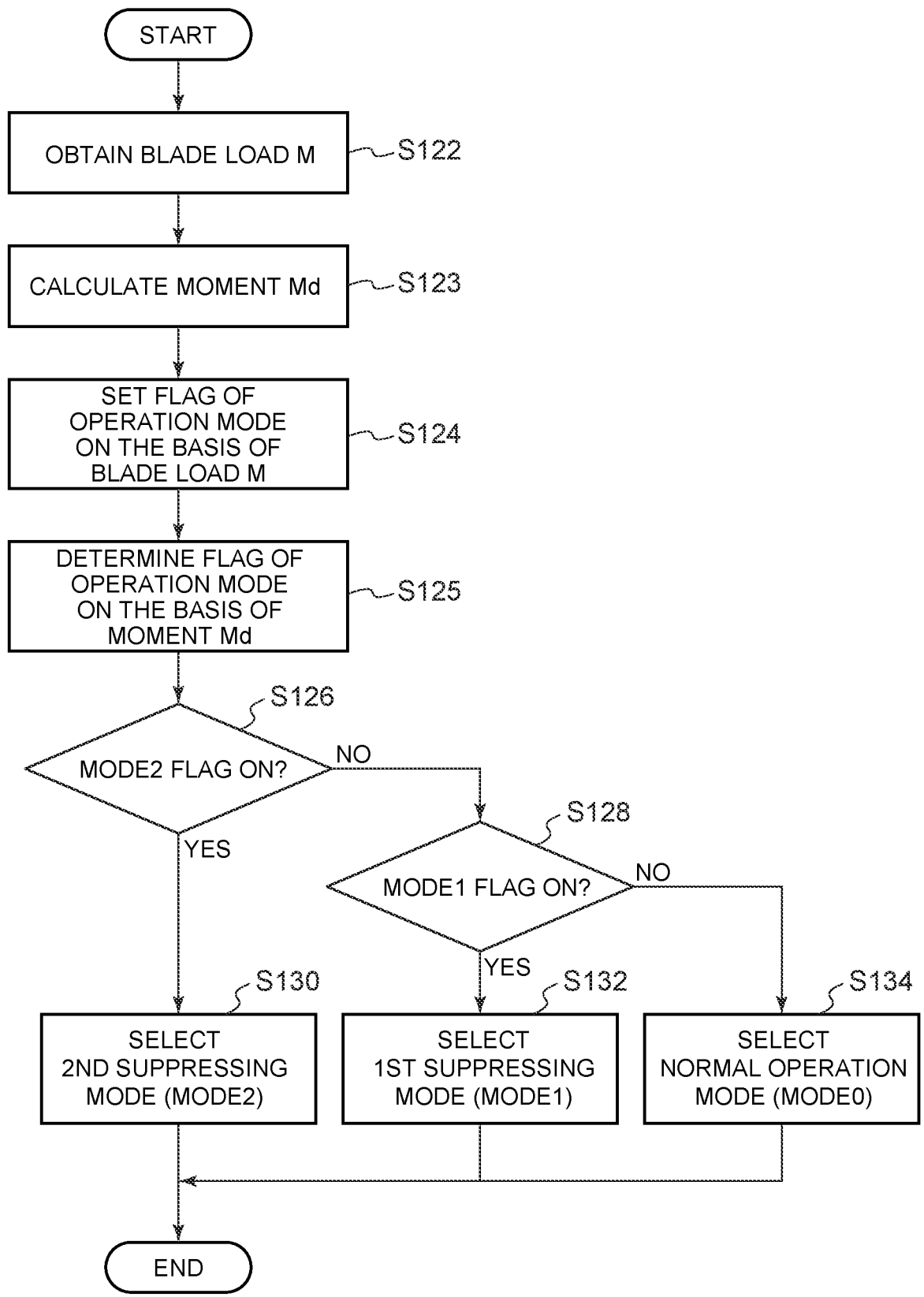
FIG. 11 is a flowchart of a method of operating a wind turbine power generating apparatus according to an embodiment.

Now, with reference to FIG. 11, described is a case in which an operation mode is selected on the basis of the moment Md of the wind turbine rotor 5 in addition to the load M applied to the wind turbine blade 2.

FIG. 11 is a flowchart of a method of operating the wind turbine power generating apparatus 1 according to an embodiment. As depicted in FIG. 11, a method of operating a wind turbine power generating apparatus according to an embodiment includes a step of obtaining a load M applied to the wind turbine blade 2 (S122), a step of obtaining a moment Md of the wind turbine rotor 5 on the basis of the load M obtained in step S122 (S123), and steps of selecting an operation mode of the wind turbine power generating apparatus 1 on the basis of the load M obtained in step S122 and the moment Md obtained in step S123 (S124 to S134). The wind turbine power generating apparatus 1 is operated in the operation mode selected in steps S124 to S134.

Among the steps in the flowchart of FIGS. 11, S122 and S124 are similar to steps S102 and S104 in the flowchart of FIG. 3 described above, and thus not described again.

In step S123, the moment calculating part 24 calculates the moment Md of the wind turbine rotor 5 on the basis of the load M obtained in step S122. Here, if the wind turbine rotor 5 includes a plurality of wind turbine blades 2, the moment Md or the moment Mq of the wind turbine rotor 5 is calculated by using the blade load of each of the plurality of wind turbine blades 2.

In step S125, the operation-mode selecting part 22 determines whether conditions for setting a flag for each operation mode are satisfied on the basis of the moment Md calculated in step S123, and turns ON a flag of one of the operation modes whose conditions are satisfied.

In step S125, for instance, the moment Md and the threshold are compared by a method similar to that depicted in FIG. 4, and thereby a flag of one of the normal operation mode, the first suppressing mode, or the second suppressing mode is turned ON.

Furthermore, the operation-mode selecting part 22 selects an operation mode corresponding to the flag of an operation mode that is turned ON in steps S124 and S125 (S126 to S134).

If the flag of the second suppressing mode (Mode2) is set ON in at least one of step S124 or S125 (YES in S126), the second suppressing mode is selected (S130). If the flag of the second suppressing mode is not turned ON in either step S124 or S125, and the flag of the first suppressing mode (Mode1) is set ON in at least one of step S124 or S125 (NO in S126 and YES in S128), the first suppressing mode is selected (S132). If none of the flag of the second suppressing mode and the flag of the first suppressing mode is turned ON in both of steps S124 and S125, and the flag of the normal operation mode (Mode0) is set ON in both of steps S124 and S125 (NO in S126 and NO in S128), the normal operation mode is selected (S134).

Accordingly, in steps S124 to S134, on the basis of the load M and the moment M, a flag of an operation mode whose conditions for setting the flag are satisfied is turned ON, and an operation mode corresponding to the flag is selected from among the normal operation mode (Mode0), the first suppressing mode (Mode1), and the second suppressing mode (Mode 2).

A description similar to the above can be applied to a case in which an operation mode is selected on the basis of the moment Mq of the wind turbine rotor 5 or the acceleration of the nacelle 7, in addition to the load M applied to the wind turbine blade 2.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A method of operating a wind turbine power generating apparatus including a wind turbine rotor having a wind turbine blade, the method comprising:
a step of obtaining a load applied to the wind turbine blade; and
a step of selecting an operation mode of the wind turbine power generating apparatus on the basis of the load, from among a plurality of operation modes including a normal operation mode and at least one load-suppressing operation mode in which the load applied to the wind turbine blade is smaller than in the normal operation mode, wherein in the step of selecting the operation mode, one of the at least one load-suppressing mode is selected if the load is equal to or greater than a threshold, and wherein the threshold of the load is variable in accordance with at least one of a moment Md of the wind turbine rotor about a line in which a rotational plane and a horizontal plane of the wind turbine rotor intersect with each other, or a moment Mq of the wind turbine rotor about a yaw-rotational axis of the wind turbine power generating apparatus.

2. The method of operating a wind turbine power generating apparatus according to claim 1, wherein, in the step of selecting the operation mode, one of the at least one load-suppressing operation mode is selected if at least one of the load or an amplitude of the load is at least a threshold.

3. The method of operating a wind turbine power generating apparatus according to claim 1, wherein the wind turbine power generating apparatus further comprises a nacelle for rotatably supporting the wind turbine rotor, wherein the method further comprises a step of obtaining an acceleration of the nacelle, and wherein, in the step of selecting the operation mode, the operation mode is selected on the basis of the acceleration of the nacelle in addition to the load.

4. The method of operating a wind turbine power generating apparatus according to claim 1, wherein, in the at least one load-suppressing operation mode, the load is suppressed more than in the normal operation mode by reducing a rotation speed of the wind turbine rotor or by changing a pitch angle of the wind turbine blade to a feather side as compared to in an operation in the normal operation mode.

5. The method of operating a wind turbine power generating apparatus according to claim 1, wherein the at least one load-suppressing operation mode includes a first load-suppressing operation mode, and a second load-suppressing operation mode in which the load is suppressed more than in the first load-suppressing operation mode by reducing a rotation speed of the wind turbine rotor or by changing a pitch angle of the wind turbine blade to a feather side as compared to in the first load-suppressing operation mode.

6. A method of operating a wind turbine power generating apparatus including a wind turbine rotor having a wind turbine blade, the method comprising:

a step of obtaining a load applied to the wind turbine blade;

a step of selecting an operation mode of the wind turbine power generating apparatus on the basis of the load, from among a plurality of operation modes including a normal operation mode and at least one load-suppressing operation mode in which the load applied to the wind turbine blade is smaller than in the normal operation mode; and a step of obtaining, on the basis of the load, at least one of a moment Md of the wind turbine rotor about a line in which a rotational plane and a horizontal plane of the wind turbine rotor intersect with each other, or a moment Mq of the wind turbine rotor about a yaw-rotation axis of the wind turbine power generating apparatus, wherein, in the step of selecting the operation mode, the operation mode is selected on the basis of the at least one of the moment Md or the moment Mq in addition to the load.

7. A wind turbine power generating apparatus, comprising:

a wind turbine rotor having a wind turbine blade;

a load sensor for obtaining a load applied to the wind turbine blade; and an operation-mode selecting part configured to select an operation mode of the wind turbine power generating apparatus, on the basis of the load obtained by the load sensor, from among a plurality of operation modes including a normal operation mode and at least one load-suppressing operation mode in which the load applied to the wind turbine blade is smaller than in the normal operation mode, wherein the operation-mode selecting part is configured to select one of the at least one load-suppressing mode if the load is equal to or greater than a threshold, and wherein the threshold of the load is variable in accordance with at least one of a moment Md of the wind turbine rotor about a line in which a rotational plane and a horizontal plane of the wind turbine rotor intersect with each other, or a moment Mq of the wind turbine rotor about a yaw-rotational axis of the wind turbine power generating apparatus.

8. The wind turbine power generating apparatus according to claim 7, wherein the operation-mode selecting part is configured to select one of the at least one load-suppressing operation mode if at least one of the load or an amplitude of the load is at least a threshold.

9. The wind turbine power generating apparatus according to claim 7, further comprising: a nacelle for rotatably supporting the wind turbine rotor; and an acceleration sensor for obtaining an acceleration of the nacelle, wherein the operation-mode selecting part is configured to select the operation mode on the basis of the acceleration of the nacelle obtained by the acceleration sensor, in addition to the load.

10. The wind turbine power generating apparatus according to claim 7, further comprising an operation control part for controlling operation of the wind turbine power generating apparatus on the basis of the operation mode, wherein the operation control part is configured to, in the at least one load-suppressing operation mode, suppress the load more than in the normal operation mode by reducing a rotation speed of the wind turbine rotor or by changing a pitch angle of the wind turbine blade to a feather side as compared to in an operation in the normal operation mode.

11. The wind turbine power generating apparatus according to claim 7, wherein the at least one load-suppressing operation mode includes a first load-suppressing operation mode, and a second load-suppressing operation mode in which the load is suppressed more than in the first load-suppressing operation mode by reducing a rotation speed of the wind turbine rotor or by changing a pitch angle of the wind turbine blade to a feather side as compared to in the first load-suppressing operation mode.

12. A wind turbine power generating apparatus, comprising:

a wind turbine rotor having a wind turbine blade;

a load sensor configured to obtain a load applied to the wind turbine blade;

an operation-mode selecting part configured to select an operation mode of the wind turbine power generating apparatus, on the basis of the load obtained by the load sensor, from among a plurality of operation modes including a normal operation mode and at least one load-suppressing operation mode in which the load applied to the wind turbine blade is smaller than in the normal operation mode; and a moment calculating part configured to obtain, on the basis of the load, at least one of a moment Md of the wind turbine rotor about a line in which a rotational plane and a horizontal plane of the wind turbine rotor intersect with each other, or a moment Mq of the wind turbine rotor about a yaw-rotation axis of the wind turbine power generating apparatus, and wherein the operation-mode selecting part is configured to select the operation mode on the basis of the at least one of the moment Md or the moment Mq obtained by the moment calculating part, in addition to the load.

* * * * *